(12) United States Patent  (10) Patent No.: US 8,830,050 B2
Ishibashi et al.  (45) Date of Patent: Sep. 9, 2014

(54) DISPLAY DEVICE FOR VEHICLE

(75) Inventors: Shuichi Ishibashi, Shimada (JP); Tai Inoue, Shimada (JP)

(73) Assignee: Yazaki Corporation, Tokyo (JP)

( * ) Notice: Subject to any disclaimer, the term of this patent is extended or adjusted under 35 U.S.C. 154(b) by 424 days.

(21) Appl. No.: 13/159,814

(22) Filed: Jun. 14, 2011

(65) Prior Publication Data

US 2011/0309925 A1  Dec. 22, 2011

(30) Foreign Application Priority Data

Jun. 17, 2010 (JP) ................................ 2010-138266

(51) Int. Cl.
*B60Q 1/00* (2006.01)
(52) U.S. Cl.
USPC .......................................... 340/461; 340/462
(58) Field of Classification Search
USPC .............. 340/435, 438, 459, 461, 932.2, 971, 340/945, 980, 462; 345/705, 970, 7, 9; 349/58; 359/585, 631, 630; 701/1, 4
See application file for complete search history.

(56) References Cited

U.S. PATENT DOCUMENTS

| | | | | |
|---|---|---|---|---|
| 5,734,358 | A * | 3/1998 | Sumiyoshi | 345/7 |
| 6,448,893 | B1 * | 9/2002 | Dobberkau et al. | 340/461 |
| 7,382,422 | B2 * | 6/2008 | Niiyama et al. | 349/58 |
| 7,679,495 | B2 * | 3/2010 | Beutnagel-Buchner et al. | 340/435 |
| 7,683,771 | B1 * | 3/2010 | Loeb | 340/461 |
| 2002/0183921 | A1 | 12/2002 | Sugiyama et al. | |
| 2008/0211651 | A1 * | 9/2008 | Beutnagel-Buchner et al. | 340/459 |
| 2010/0014163 | A1 * | 1/2010 | Morimoto et al. | 359/585 |

FOREIGN PATENT DOCUMENTS

| | | |
|---|---|---|
| DE | 10 2009 001 412 A1 | 9/2010 |
| JP | 54-142748 A | 11/1979 |
| JP | 63-269738 A | 11/1988 |
| JP | 4-39130 A | 2/1992 |
| JP | 5-5442 U | 1/1993 |
| JP | 09-196690 A | 7/1997 |
| JP | 2002-356118 A | 12/2002 |
| JP | 2005-186784 A | 7/2005 |
| JP | 2006-131103 A | 5/2006 |
| JP | 2006-163156 A | 6/2006 |
| JP | 2008-001120 A | 1/2008 |
| JP | 2008-238646 A | 10/2008 |
| JP | 2009-51045 A | 3/2009 |
| JP | 2011-207247 A | 10/2011 |
| WO | 2010/102694 A1 | 9/2010 |

OTHER PUBLICATIONS

Office Action, dated Jan. 21, 2014, issued by the Japanese Patent Office in counterpart Japanese Patent Application No. 2010-138266.

* cited by examiner

*Primary Examiner* — Van T. Trieu
(74) *Attorney, Agent, or Firm* — Sughrue Mion, PLLC

(57) ABSTRACT

A display device for a vehicle includes first and second display units that respectively display vehicle information and are arranged behind a steering wheel of the vehicle, and a front face cover that covers a front face of the first display unit and a front face of the second display unit. The first display unit is arranged at a portion inside of the steering wheel in a radial direction of the steering wheel on a field of view from an eye range of a person sitting on a driving seat of the vehicle. The second display unit is arranged at a portion outside of the steering wheel in the radial direction of the steering wheel on the field of view from the eye range. The front face cover is integrally formed so as to be continuous in the radial direction of the steering wheel.

4 Claims, 5 Drawing Sheets

DISPLAY DEVICE FOR VEHICLE

BACKGROUND

The present invention relates to a display device for a vehicle that displays various information of the vehicle.

In vehicles, vehicle information such as a traveling speed, warning or the like of a vehicle are displayed on a display device on the vehicle. In such display devices for the vehicle, some of the display devices are a center meter type display device. In such display device, the display can be visually observed by a passenger in addition to a driver sitting on a driving seat of the vehicle. However, vehicle information is mainly necessary for a driver of a vehicle when the driver drives the vehicle. Therefore, the display devices for a vehicle are usually arranged in respective front portions of driving seats. A display of a display device for a vehicle arranged in a front portion of a driving seat is to be visually observed by a driver through a space inside of a steering wheel in a radial direction of the steering wheel.

Meanwhile, a number of kinds or an amount of content of vehicle information which can be grasped in a vehicle has been increased year by year. In the increased information, some of the information contents are not displayed in detailed by only a conventional display unit having an instrument or a symbol. For this reason, an auxiliary displaying is sometimes performed by using a variable display unit such as, for example, a liquid display device in addition to a displaying by using the conventional display unit. In this case, the variable display unit is arranged in a front portion of a driving seat together with the conventional display unit (e.g., patent documents 1 and 2).

However, a portion where a driver can visually observe through a space inside of a steering wheel in the radial direction thereof, is limited and a size of the variable display unit to be arranged is also limited. Therefore, in order to eliminate the limitation of the size of the variable display unit, it is necessary to perform the auxiliary displaying by using a display unit which is placed at a position where a driver can visually observe through a space outside of the steering wheel in the radial direction thereof (e.g., patent documents 3 and 4).
Patent Document 1: JP-A-2002-356118
Patent Document 2: JP-A-2006-131103
Patent Document 3: JP-A-9-196690
Patent Document 2: JP-A-2008-1120

In the above described patent documents 3 and 4, the variable display unit and the conventional display unit are arranged such that a driver can visually observe both of the display units through a space above the steering wheel. However, it is preferable to attain a field of view above the steering wheel for visibility in the forward direction of the vehicle. Therefore, it is ideal that the conventional display unit and the variable display unit are separately arranged so as not to obstruct the field of view in the forward direction of the vehicle.

However, the separately arrangement as described in the above gives a visual impression that both of the display units are independent different things. Accordingly, even when vehicle information having a correlation with vehicle information displayed on the conventional display unit, is displayed on the variable display unit, there is a possibility for the driver to overlook the vehicle information.

The above problem may commonly occur in cases where contents having correlated vehicle information are displayed on a plurality of display units irrespective of kinds of the display units and what kind of display style each of the display units uses.

SUMMARY

The invention is made in view of the above circumstances, and the purpose of the invention is to provide a display device for a vehicle which can provide, to a driver, an impression that there is a correlation between display contents of vehicle information respectively displayed on a plurality of display units without obstructing a field of view in a forward direction of a vehicle even when the display contents having correlated vehicle information are displayed on the display units.

In order to achieve the above object, according to the present invention, there is provided a display device for a vehicle, comprising:

first and second display units that respectively display vehicle information and are arranged behind a steering wheel of the vehicle; and a front face cover that covers a front face of the first display unit and a front face of the second display unit, wherein the first display unit is arranged at a portion inside of the steering wheel in a radial direction of the steering wheel on a field of view from an eye range of a person sitting on a driving seat of the vehicle;

wherein the second display unit is arranged at a portion outside of the steering wheel in the radial direction of the steering wheel on the field of view from the eye range; and wherein the front face cover is integrally formed so as to be continuous in the radial direction of the steering wheel.

Preferably, the vehicle information displayed on the first display unit is correlated with the vehicle information displayed on the second display unit.

Preferably, the display device further comprises a guide display unit that is arranged between the first display unit and the second display unit to guide a line of sight of the person from the first display unit to the second display unit.

In accordance with the above configuration, in a case where the person (a driver) watches, from the eye range of the vehicle, the first display unit arranged in a portion inside of the steering wheel in the radial direction thereof and also in a case where the driver watches, from the eye range of the vehicle, the second display unit arranged in a portion outside of the steering wheel in the radial direction thereof, the driver may visually observe the identical front face cover.

Therefore, it is possible to allow a display content (vehicle information) of the first display unit and a display content (vehicle information) of the second display unit to be visually observed as one collective display content. Accordingly, it is possible to provide, to the driver, an impression that there is a correlation between the display contents of the vehicle information displayed on the different display units.

In addition, since it is not necessary that both of the first display unit and the second display unit are arranged in a portion outside of the steering wheel in the radial direction having a wide field of view other than a portion inside thereof having a narrow field of view in order to give such an impression to the driver, it is possible to arrange both of the first and second display units so as not to obstruct the field of view of the driver in the forward direction of the vehicle.

Preferably, an antireflection film is provided on a front surface of the front face cover, and the front surface of the front face cover has a curved face which is formed so that an observation color of the curved face viewed from the eye range differs depending on an observation position in the eye range due to a difference in an interference wavelength of reflection light reflected by the antireflection film, the reflection light advancing toward the eye range from the front surface.

In accordance with the display device, the antireflection film provided on the surface of the front face cover makes phases of reflection light by the surface of the antireflection film and reflection light by the surface the front face cover different from one another by a half wavelength so as to cancel out both of the reflection light with each other. Therefore, the driver is not bothered by the reflection light from the surface of the front face cover.

In the antireflection film provided at a curved part of the front face cover, an observation angle of the driver with respect to the antireflection film from the eye range or a projection angle of light from a light source with respect to the antireflection film differs depending on its position. In a multi-layer film like the antireflection film formed such that a plurality of films having different refraction indexes are laminated, an interference wavelength generated due to a spectroscopic effect caused by the multi-layer film is changed when a viewing angle or a projection angle of the light is changed so that an appearance color of the multi-layer film is changed.

For this reason, the driver may visually observe the curved part in the surface of the front face cover by a different color depending on its position. Accordingly, by arranging a part of which the color visually observed by the driver is different depending on its position, a decorative property in a visual impression as the display device for a vehicle can be improved.

In accordance with the display device for the vehicle according to the invention, even in a case where display contents of vehicle information having a correlation therebetween are displayed on a plurality of display units, it is possible to provide, to a driver, an impression that there is the correlation between the display contents of the vehicle information on the display units without obstructing a field of view in a forward direction of a vehicle.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

Figure 1:
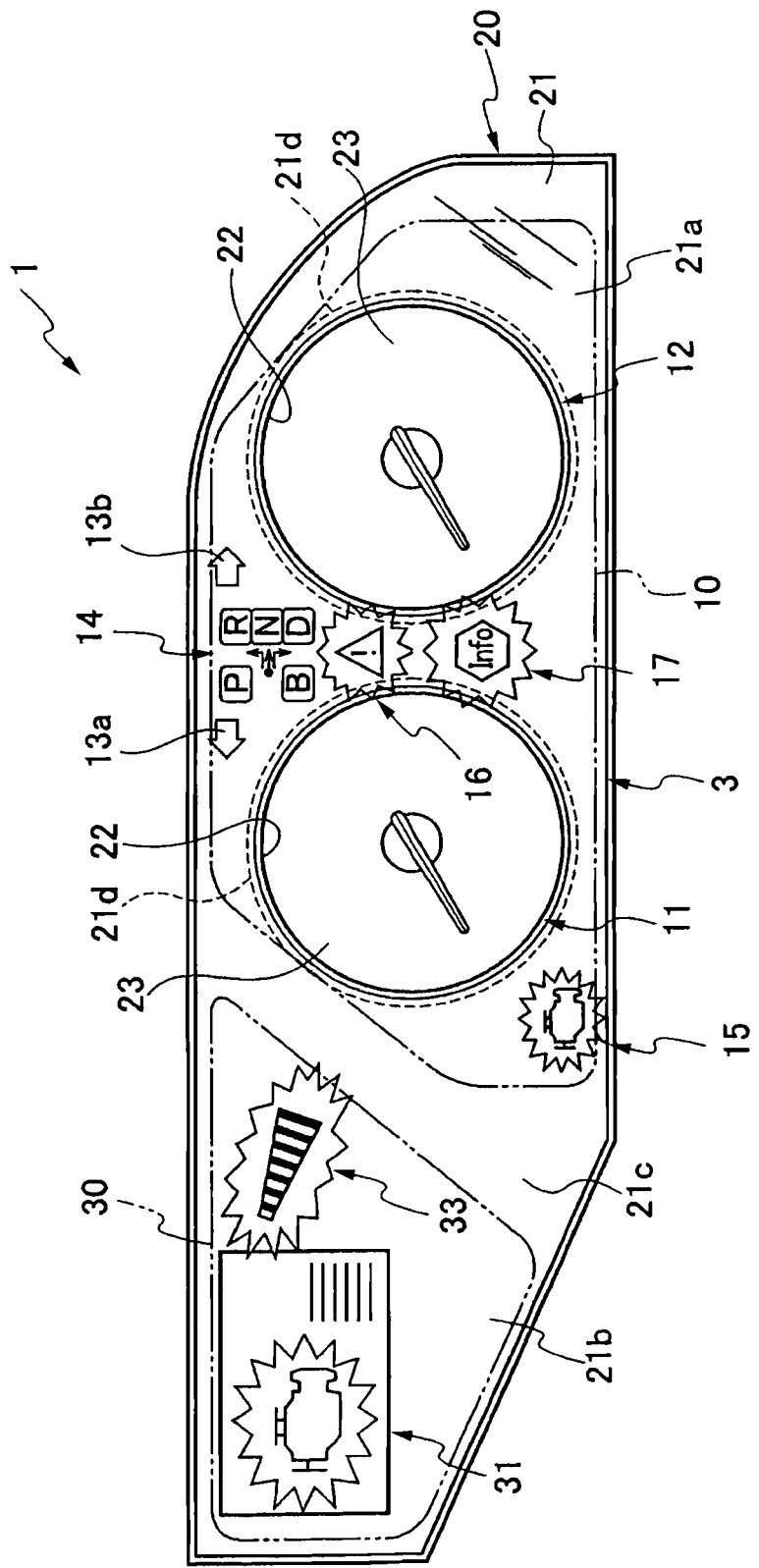
FIG. 1 is an elevational view showing a display device for a vehicle according to an embodiment of the invention.

An embodiment of the invention is described with reference to the accompanying drawings. First, a positional relationship between a display device for a vehicle and a steering wheel according to the embodiment of the invention is described below with reference to FIG. 1. FIG. 1 is an elevational view showing the display device for a vehicle according to the embodiment of the invention.

As shown in FIG. 1, the display device 1 for a vehicle has a first display area 10 (corresponding to a first display unit), a second display area 30 (corresponding to a second display unit), and a front face cover 20 that is configured by a single member and covers both of the front face of the first display area 10 and the front face of the second display area 30. A housing (not shown) of the first display area 10 and a housing (not shown) of the second display area 30 may be combined together or separated from each other.

The first display area 10 displays vehicle information such as a speed meter 11, a tachometer 12, winkers 13a and 13b, a shift range 14, an engine control abnormality symbol 15, a warning state symbol 16, a notice information symbol 17 for a notice other than warning (hereinafter, referred to as "the notice information symbol") or the like.

The second display area 30 displays vehicle information 31 having a correlation with a display content of vehicle information displayed on the first display area 10 if needed. The vehicle information 31 is, for example, state information having a correlation with an abnormality in controlling of an engine of the vehicle at a time when the first display area 10 displays the engine control symbol 15 and the warning state symbol 16 or various maintenance information of the vehicle at a time when the first display area 10 displays the notice information symbol 17.

Meanwhile, during the displaying of the vehicle information 31, the second display area 30 displays a guidance symbol 33 for attracting an attention of a user to the display of the vehicle information 31 on the second display area 30. The guidance symbol 33 has, for example, an outer shape which is tapered so as to be thinner as it is separated from the first display area 10, and is divided into a plurality of segments in a direction of approaching to or separating from the first display area 10. During the displaying of the guidance symbol 33, a mode that the segments are sequentially displayed from a side of a first display area 10 to a side of the second display area 30, is repeated. The displaying of the guidance symbol 33 as described above can guide a line of sight of a driver (not shown) who is paying attention to the first display area 10, onto the second display area 30.

The front face cover 20 is adapted to prevent dust or the like from adhering to the front faces of the first display area 10 and the second display area 30, and has a cover body 21, and two sets of a meter ring 22 and a meter cover 23.

The cover body 21 is formed of a translucent material, and has a first cover part 21a for covering the front face of the first display area 10, a second cover part 21b for covering the front face of the second display area 30 and a third cover part 21c connecting the first cover part 21a and the second cover part 21b to each other.

Figure 2:
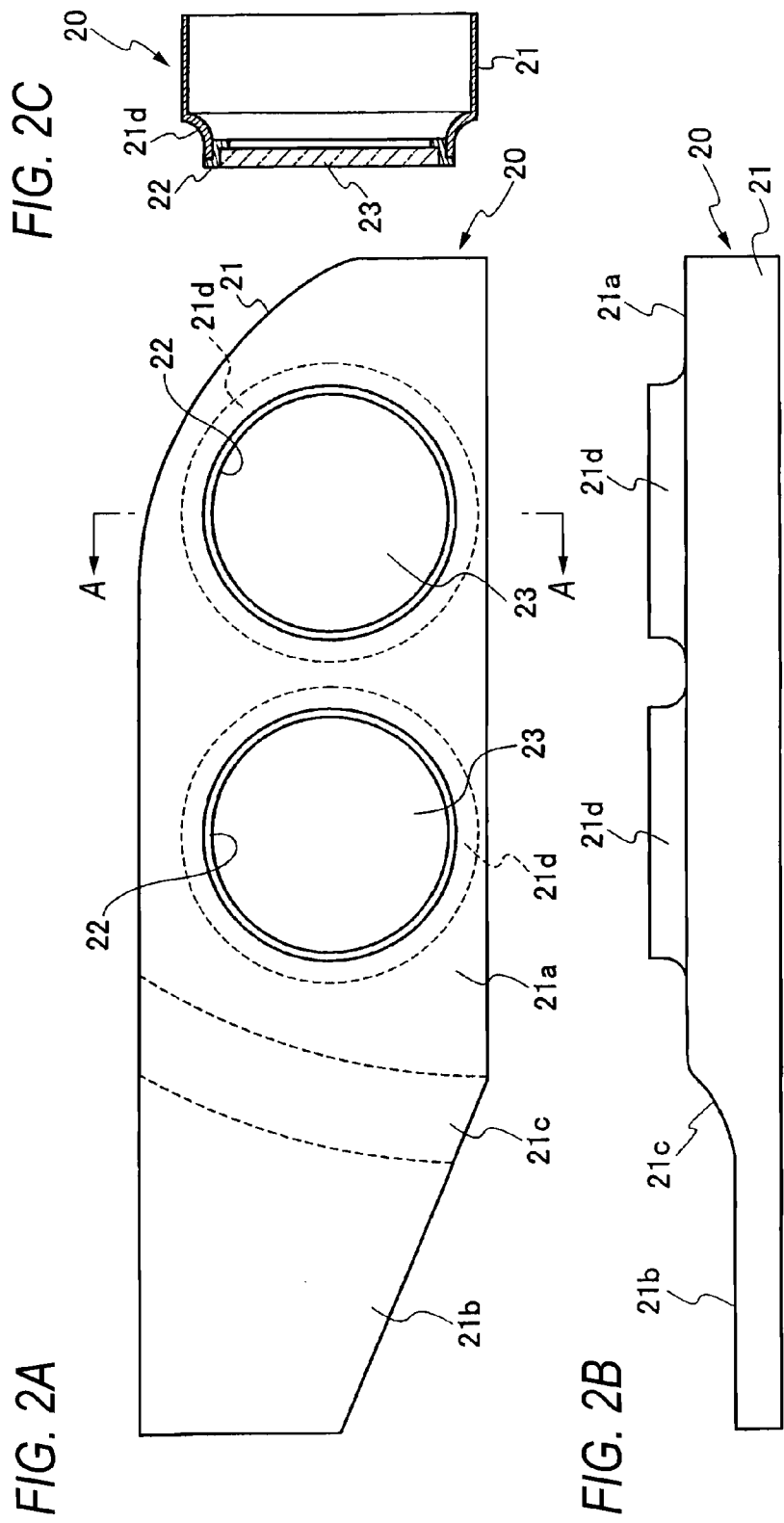
FIG. 2A is an elevational view showing a front face cover shown in FIG. 1.
FIG. 2B is a bottom view showing the front face cover shown in FIG. 1.
FIG. 2C is a cross sectional view of FIG. 2B taken along line A-A.

As shown in FIGS. 2A and 2B, the first cover part 21a has cylindrical protruding parts 21d and 21d each having a curved tapered shape corresponding to the speed meter 11 and the taco meter 12 in the first display 10. Each of the first cover part 21a and the second cover part 21b other than the cylindrical protruding parts 21d is formed to be roughly plane. As shown in FIG. 2B, the first cover part 21a and the second cover part 21b are constituted such that the positions thereof are shifted with each other in the back-and-forth direction of the vehicle. Therefore, the third cover part 21c is formed by a stepwise face having a curved face.

In the embodiment, the curved face of the third cover part 21c and the curved faces of the cylindrical protruding parts 21d correspond to curved faces.

As shown in FIG. 2A, the meter ring 22 is formed in a ring shape. As shown in FIG. 2C, the meter ring 22 is attached and fixed to an open end of the cylindrical protruding part 21d.

The meter cover 23 is formed of a translucent material in a disc shape and is fitted into and fixed to a circular open part of the meter ring 22. The cover body 21 and the meter cover 23 can be in a color combination of the same colors or different colors (including non-color). By changing the color combination, it is possible to achieve variation in decorative properties on the front face cover 20.

Figure 3:
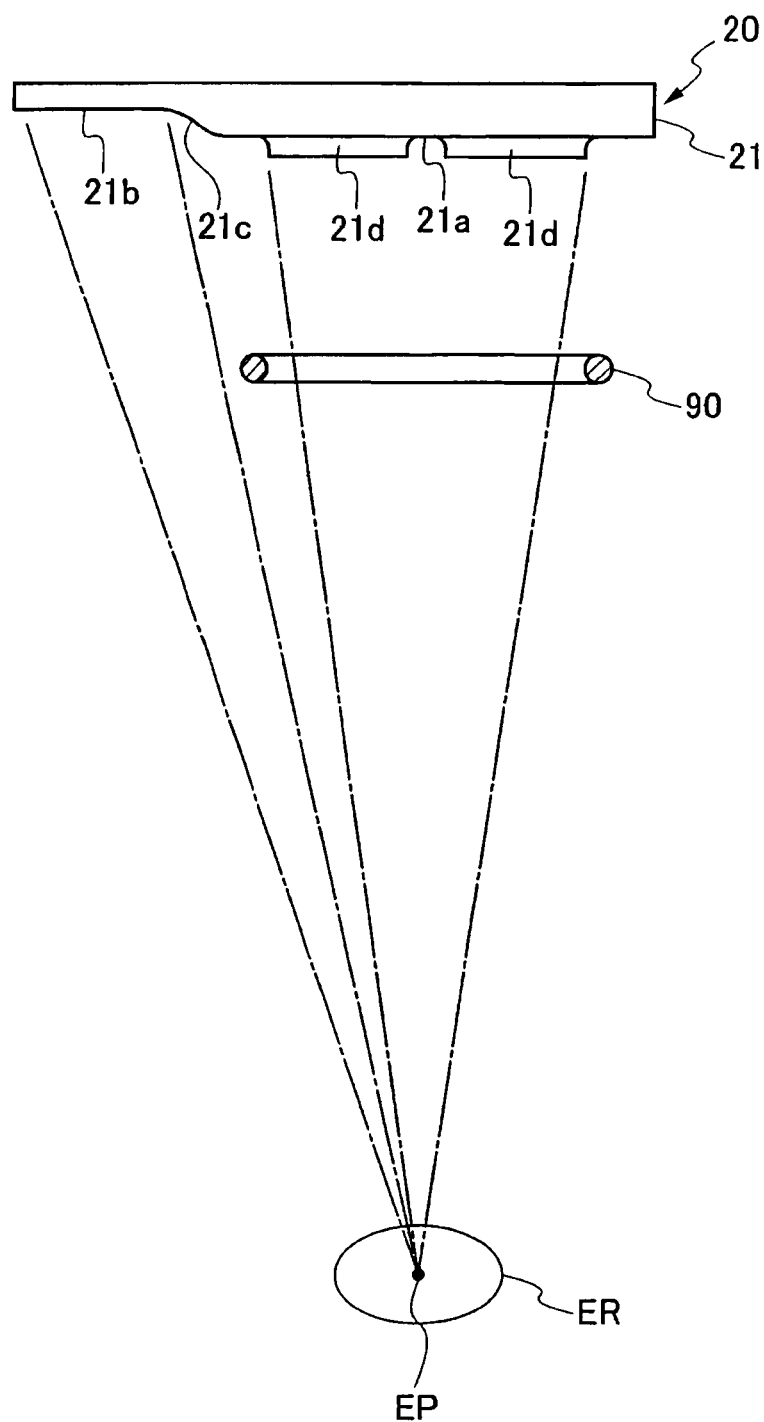
FIG. 3 is an explanatory view showing a positional relationship among the front face cover in FIG. 2, a steering wheel and an eye point of a driver.

The front face cover 20 having the above structure is arranged behind the steering wheel 90 as shown in FIG. 3. The front face cover 20 is formed in a continuous integral shape extending over the first and second display areas 10, 30 in the radial direction of the steering wheel 90 so as to cover the front faces of the first and second display areas 10, 30. The first cover part 21a of the cover body 21 and the first display area 10 having the front face covered by the first cover part 21a are arranged in a portion near the steering wheel 90 rather than the second cover part 21b of the cover body 21 and the second display area 30 having the front face covered second cover part 21b.

Thus, since the second display area 30 and the second cover part 21b are separated from the steering wheel 90 in the back-and-forth direction of the vehicle rather than the first display area 10 and the first cover part 21a, a hand of a driver who operates the steering wheel 90 is prevented from interfering with the second display area 30 and the second cover part 21b.

The front face cover 20 arranged as in the above, is constituted in such a manner that the first cover part 21a of the cover body 21 is positioned in a portion inside of the steering wheel 90 in the radial direction of the steering wheel 90 and the second cover part 21b is positioned in a portion outside of the steering wheel 90 in the radial direction of the steering wheel 90 on a field of view of a driver (not shown) from an eye point EP positioned in an eye range ER of the vehicle.

Figure 4:
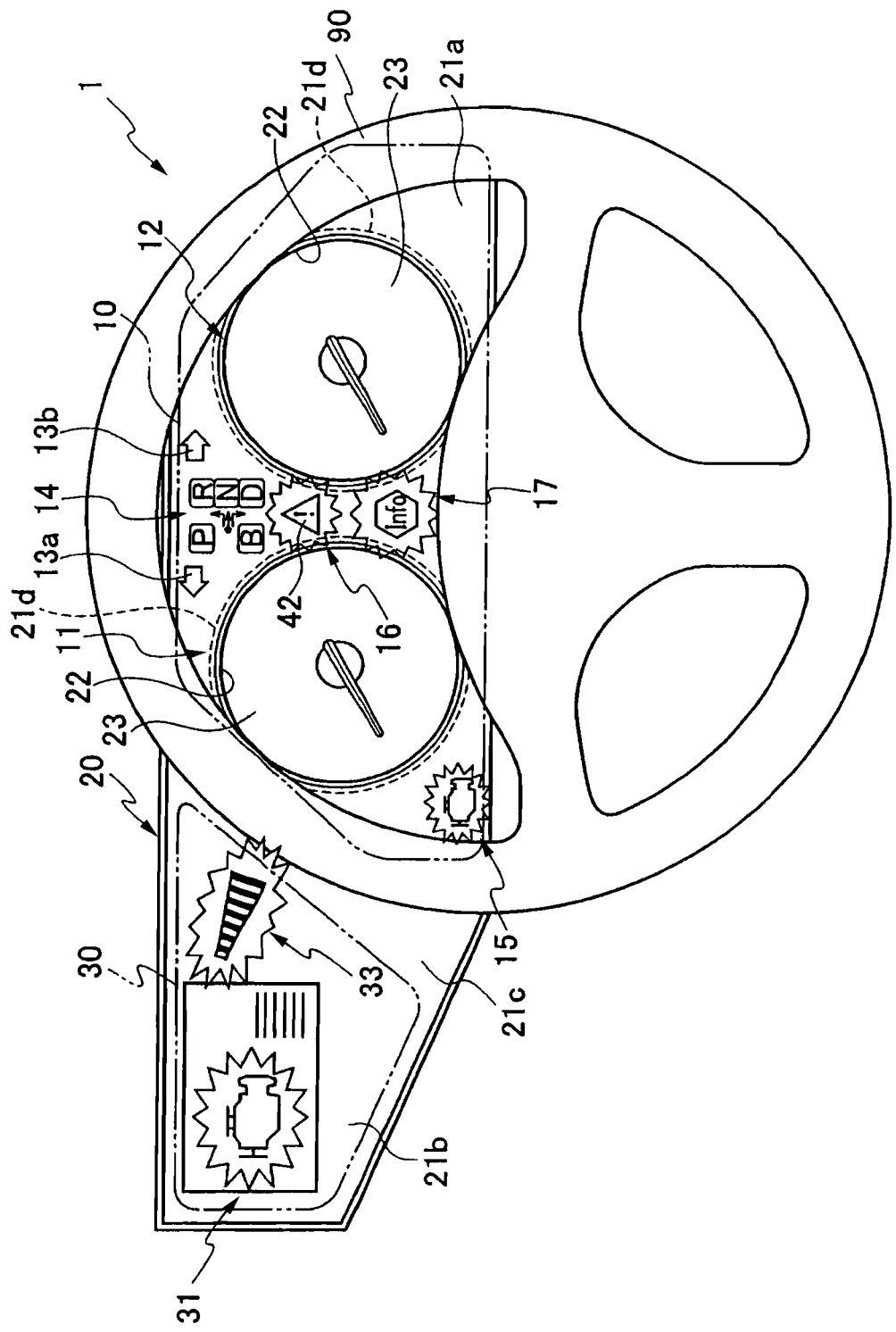
FIG. 4 is an explanatory view showing a positional relationship between the display device and the steering wheel on a field of view of the driver from the eye point in FIG. 3.

Therefore, as shown in FIG. 4, the driver (not shown) can visually observe a display content of the first display area 10 through the portion inside of the steering wheel 90 in the radial direction thereof and can visually observe a display content of the second display area 30 through the portion outside of the steering wheel 90 in the radial direction thereof.

Figure 5:
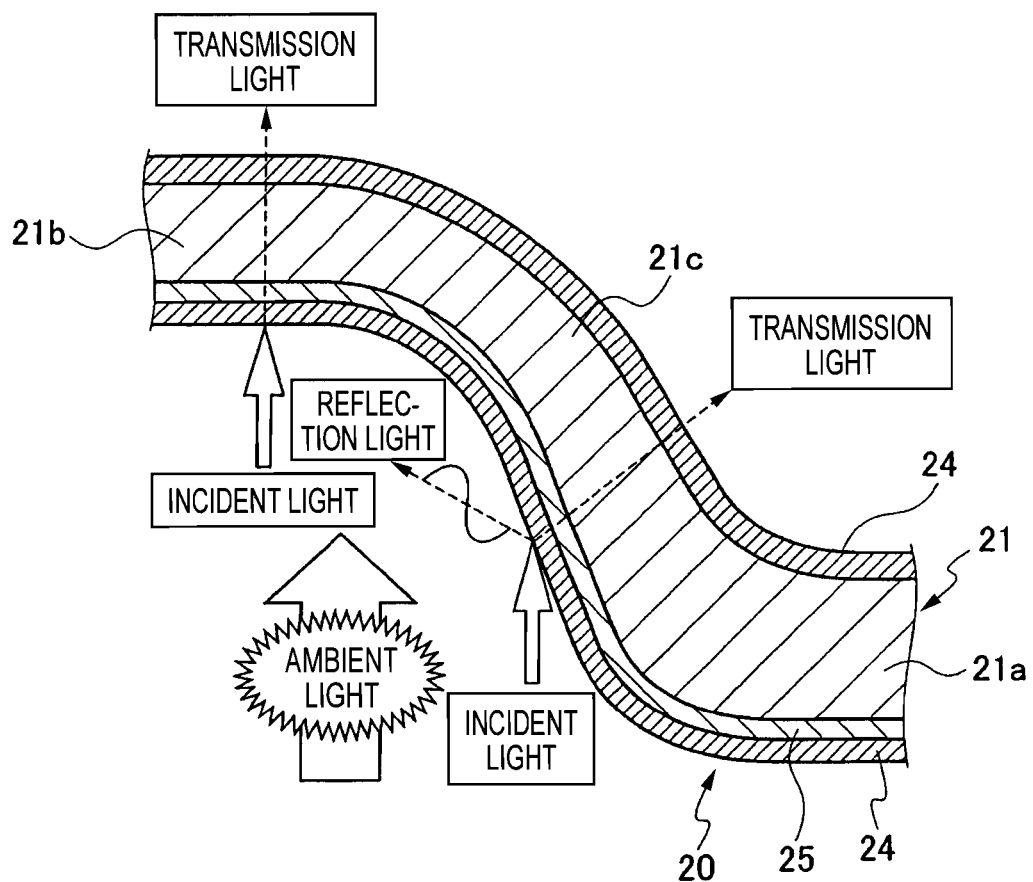
FIG. 5 is a main part enlarged cross sectional view explanatorily showing a state of transmission and reflection of light at a curved part of the front face cover in FIG. 2.

Meanwhile, in the display device 1 for a vehicle of the embodiment, an antireflection film 24 (see FIG. 5) is formed on each of the cover body 21 and the meter cover 23 of the front face cover 20. As shown in FIG. 5 which shows the third cover part 21c of the cover body 21 by enlarging it, the antireflection films 24 are respectively formed on both of front and rear faces of the cover body 21 of the embodiment. An optical path restriction film 25 formed of fine louvers in which shading parts and translucent parts are alternately arranged in a striped pattern, is provided between the surface of the cover body 21 and the antireflection film 24. The optical path restriction film 25 is adapted to prevent light in an unnecessary direction from passing through the cover body 21. The optical path restriction film 25 can be formed on the rear face of the cover body 21 or both of the front and rear faces thereof. The optical path restriction film 25 can be formed to be superposed on the antireflection film 24 so as to cover the antireflection film 24 which is directly formed on the front or rear face of the cover body 21.

The antireflection film 24 is formed in such a manner that a plurality thin films having different refraction indexes are laminated. The antireflection film 24 cancels reflection light reflected by the surface of the antireflection film 24 by using reflection light which passes through the antireflection film 24, is reflected by the surface of the front face cover 20 and has a phase shifted by a half wavelength therefrom so as to prevent light projected to the front face cover 20 from being reflected. Therefore, the antireflection film 24 prevents ambient light or the like from being reflected to a driver side by the front face cover 20.

Meanwhile, in the cylindrical protruding parts 21d of the first cover part 21a and the third cover part 21c each having the curved face, a relative relationship between directions of lines of sight of the driver from the eye point EP with respect to the normal lines thereof differs depending on the position. That is, regarding the antireflection film 24 of the cylindrical protruding parts 21d or the third cover part 21c, the direction of the line of sight to the film face (the surface) of the antireflection film 24 differs depending on the eye point EP of the driver.

In the cylindrical protruding part 21d or the third cover part 21c, even when light is projected from a light source identical to a light source of the first cover part 21a or the second cover part 21b excluding the cylindrical protruding part 21d, an incident angle of the light with respect to the antireflection film 24 is different from that of the first cover part 21a or the second cover part 21b excluding the cylindrical protruding part 21d.

In a multi-layer film like the above described antireflection film 24 formed such that a plurality of thin films having different refraction indexes are laminated, when a view angle is changed or a projection angle of light is changed, an interference wavelength generated due to a spectroscopic effect caused by the multi-layer film is changed so that an appearance color of the multi-layer film is changed.

Therefore, the driver may visually observe the cylindrical protruding part 21d of the first cover part 21a having the curved face or the third cover part 21c having the curved face as an iridescence color whereby the appearance color is changed depending on the direction of the line of sight of the driver with respect to the surfaces thereof.

Thus, in accordance with the display device 1 for a vehicle of the embodiment, the display device 1 for a vehicle is configured such that the front face of the first display area 10 which is visually observed through the portion inside of the steering wheel 90 in the radial direction on a field of view of a driver from the eye point EP and the front face of the second display area 30 which is visually observed through the portion inside of the steering wheel 90 in the radial direction on the field of view of the driver from the eye point EP are covered with the integral front face cover 20 continuous in the radial direction of the steering wheel 90.

Consequently, when the driver watches, from the eye point EP, the display of the first display area 10 arranged in the portion inside of the steering wheel 90 in the radial direction and also when the driver watches, from the eye point EP, the display of the second display area 30 arranged in the portion inside of the steering wheel 90 in the radial direction, the driver may visually observe the identical front face cover 20.

Therefore, even in a case where, for example, the engine control abnormality symbol 15 and the warning state symbol 16 or the notice information symbol 17 of the first display area 10, and the vehicle information 31 of the second display area 30 having the correlation with the symbols 15 and 16 or the symbol 17 are divisionally displayed in the portions inside and outside of the steering wheel 90 in the radial direction on a field of view of a driver, the driver can visually observe both of the display contents as if the display contents are a collective display content displayed in a portion inside of the identical front face cover 20. Accordingly, it is possible to give, to the driver, a visual impression that the engine control abnormality symbol 15 and the warning state symbol 16 or the notice information symbol 17 of the first display area 10, and the vehicle information 31 of the second display area 30 are the display contents having the correlation therebetween.

In addition, it is not necessary to arrange both of the first display area 10 and the second display area 30 in the portion having a wide field of view at the outside of the steering wheel 90 in the radial direction other than the portion having a narrow field of view at the inside thereof in order to give the above impression to the driver. Consequently, the first and second display areas 10, 30 can be arranged so as not to obstruct the field of view of the driver of the vehicle in the forward direction.

While the antireflection films 24 are respectively formed on the front and rear surfaces of the cover body 21 in the embodiment, the antireflection film 24 can be formed only on the front surface. In addition, it is arbitrary whether or not the antireflection film 24 is formed on each of the cover body 21 and the meter cover 23 as in the embodiment.

In a case where the antireflection film 24 is formed on the front face cover 20 for the purpose of glare-proofing as in the embodiment, it is possible to additionally achieve a configuration capable of improving a visually decorative property in which the color varies depending on a watching position by providing the cylindrical protruding part 21d having the curved face or the third cover part 21c having the curved face on the front face cover 20.

The embodiment is described by taking, as an example, a case where the vehicle information 31 such as the state information, the maintenance information or the like having the correlation with any of the symbols displayed as the vehicle information on the first display area 10, is displayed on the second display area 30. However, the invention can be widely adopted to the display device for a vehicle irrespective of a kind of each of the display units and the respective display styles as long as the display device for a vehicle displays display contents of vehicle information having a correlation therebetween on the plurality of display units.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japanese Patent Application No. 2010-138266 filed on Jun. 17, 2010, the contents of which are incorporated herein by reference.

This invention is markedly useful for a case where contents of vehicle information having a correlation therebetween on a plurality of display units.

REFERENCE SIGNS LIST 1 display device
10 first display area (first display unit)
11 speed meter (vehicle information)
12 taco meter (vehicle information)
13a, 13b winker (vehicle information)
14 shift range (vehicle information)
15 engine control abnormality symbol (vehicle information)
16 warning state symbol (vehicle information)
17 symbol of information of notice other than warning (vehicle information)
20 front face cover
21 cover body
21a first cover part
21b second cover part
21c third cover part (curved face)
21d cylindrical protruding part 21d
22 meter ring
23 meter cover
24 antireflection film
25 optical path restriction film
30 second display area (second display unit)
31 vehicle information
33 guidance symbol
90 steering wheel
EP eye point
ER eye range

What is claimed is:

1. A display device for a vehicle, comprising:
first and second display units that respectively display vehicle information and are arranged behind a steering wheel of the vehicle; and
a front face cover that covers a front face of the first display unit and a front face of the second display unit,
wherein the first display unit is arranged at a portion inside of the steering wheel in a radial direction of the steering wheel on a field of view from an eye range of a person sitting on a driving seat of the vehicle;
wherein the second display unit is arranged at a portion outside of the steering wheel in the radial direction of the steering wheel on the field of view from the eye range; and
wherein the front face cover is integrally formed so as to be continuous in the radial direction of the steering wheel.

2. The display device according to claim 1, wherein the vehicle information displayed on the first display unit is correlated with the vehicle information displayed on the second display unit.

3. The display device according to claim 1, further comprising:
a guide display unit that is arranged between the first display unit and the second display unit to guide a line of sight of the person from the first display unit to the second display unit.

4. The display device according to claim 1, wherein an antireflection film is provided on a front surface of the front face cover; and
wherein the front surface of the front face cover has a curved face which is formed so that an observation color of the curved face viewed from the eye range differs depending on an observation position in the eye range due to a difference in an interference wavelength of reflection light reflected by the antireflection film, the reflection light advancing toward the eye range from the front surface;
wherein the antireflection film substantially conforms to the front surface of the front face cover.

* * * * *